(12) United States Patent
Jelmert

(10) Patent No.: US 6,921,488 B1
(45) Date of Patent: Jul. 26, 2005

(54) PROCESS AND APPARATUS FOR THE CONTROL OF UNDESIRABLE ORGANISMS IN A WATER SYSTEM

(75) Inventor: Anders Jelmert, Storebo (NO)

(73) Assignee: MetaFil AS, Hovik (NO)

(*) Notice: Subject to any disclaimer, the term of this patent is extended or adjusted under 35 U.S.C. 154(b) by 40 days.

(21) Appl. No.: 10/130,209
(22) PCT Filed: Nov. 15, 2000
(86) PCT No.: PCT/NO00/00385
§ 371 (c)(1), (2), (4) Date: Jul. 1, 2002
(87) PCT Pub. No.: WO01/36339
PCT Pub. Date: May 25, 2001

(30) Foreign Application Priority Data
Nov. 15, 1999 (NO) .......................................... 19995582

(51) Int. Cl.⁷ ................................................. C02F 1/68
(52) U.S. Cl. ...................... 210/764; 210/220; 210/739; 210/143
(58) Field of Search ................................ 210/764, 220, 210/739, 143; 95/263

(56) References Cited

U.S. PATENT DOCUMENTS
5,190,670 A * 3/1993 Stearns ........................ 210/767
5,932,112 A * 8/1999 Browning, Jr. .............. 210/750
2003/0205135 A1 11/2003 McNulty
2003/0205136 A1 11/2003 McNulty

FOREIGN PATENT DOCUMENTS
JP 10230247 A * 9/1998

* cited by examiner

Primary Examiner—Robert A. Hopkins
(74) Attorney, Agent, or Firm—Rothwell, Figg, Ernst & Manbeck

(57) ABSTRACT

There is described a process for the treatment of water to prevent the survival of unwanted organisms in said water. The process is based on the supply of gas into the water at pressures greater than 1 atmosphere, while ensuring that the mass trasnport of gas into the water is greater that the mass loss across the air-water (surface) interface, i.e. such that a gas super-saturated condition is established. Further, there is described an apparatus or system for the treatment of a body of water, i.e. to prevent the survival of organism in said water. A preferable embodiment comprises a compressor which delivers a compressed gas to said water system in an amount sufficient to establish a supersaturated condition in said body of water.

22 Claims, 4 Drawing Sheets

PROCESS AND APPARATUS FOR THE CONTROL OF UNDESIRABLE ORGANISMS IN A WATER SYSTEM

The present invention relates to the treatment of water systems containing potentially undesirable organisms, and more particularly to a method and apparatus for treating such water systems to kill undesirable organisms.

A preferred embodiment of the present invention relates to the treatment of ships' ballast water to kill potentially undesirable organisms in said water to prevent them from being transported from one coastal area to another.

As stated above, the invention relates to water systems in general, but as ships' ballast water is recognised internationally as a vector for the translocation of invasive marine organisms to environments where they do not belong, the description below mainly concerns the treatment of such ballast water systems.

A number of studies aimed at finding ways to reduce the risk of introducing marine pests via ballast water have been conducted, but so far, ecologically acceptable or economically feasible solutions have not been obtained.

When a ship unloads cargo in a foreign port, the resulting empty holds of the ship are often filled with the local water as ballast to stabilise the ship. When arriving at another port to take on replacement cargo, the ship typically discharges the prior local, that has now become-foreign, ballast water into the coastal waters in or near the second port, thereby introducing nonindigenous organisms such as Crustaceans, Polychaete annelides, tubellarian flatworms, cnidarians and molluscs. Even fishes have been encountered (Carlton, T.C, et. al., Science vol. 261:78–82, 1993). Of the algal groups, diatoms predominate, while dinoflagellates have been found. As could be expected, bacteria and vira are also present in the ballast water. This translocation of organisms may have a deleterious (or at least an unknown) effect on the eco-system of the receiving coastal waters.

At present only a few non-chemical control options seems readily available such as ballast water uptake management, mid-ocean exchange of ballast water where the ballast water is replaced by oceanic water, and the ability to reduce ships permission to discharge. The effectiveness of managing the uptake of ballast water is limited by the ballasting requirement of ships. There are two methods of mid-ocean ballast exchange; reballasting and ballast dilution (flushing). Reballasting is considered by the shipping industry to be dangerous for may ships. Ballast dilution is a safer operation, but less efficient. To ensure a reasonable efficiently, each tank must be flushed with water corresponding to 3–4 times its own volume. This implies increased cost of operations (fuel and manpower) in addition to significant shorter life span of ballast water pumps.

Due to high harbour fees, and time-dependent running costs of operation, a treatment process which can be conducted during the ballasting, or whilst the ship is en route or during the discharge of the ballast water is favourable.

Besides the noted ballast water management options, the only non-chemical option for en route treatment, at present, is heat treatment using the waste heat from the ships' engines, which has been shown to be effective against many plankton organisms. The effectiveness will however be dependent on the ambient sea temperature through which the ship travels. The cost of implementing such a method seems prohibitively high with the current technological development.

This option, and further possible treatment processes are described in a report from Ecoports (Oemchke, D (1999), <<The treatment of ships' ballast water>>, Ecoports Monograph Series No. 18 (Ports Corporation of Queensland, Brisbane)).

The above indicated publication discloses that clarification by filtration or cyclonic separation may have a potential for ballast water treatment. These systems will not be effective for smaller organisms, so secondary treatment will be necessary. Use of UV irradiation and high power ultrasound has been suggested as possible secondary treatment methods. Further, it has been proposed to use chemicals such as chlorine dioxide and ozone known from conventional water treatment technology.

The basic concept of the present invention, i.e. to subject aquatic organisms to gas supersaturated water has to our knowledge not been used or proposed as a method for the treatment of ballast water, or any other kind of water systems.

Several publications describe treatment systems for ballast water. U.S. Pat. No. 5,192,451 discloses a method of controlling the growth of zebra mussels in ship ballast water by adding a polymer to the ballast water. U.S. Pat. Nos. 5,376,282 and 5,578,116 disclose the use of a vacuum and agitation for reducing the dissolved oxygen of natural source water specifically to a level below that sufficient to support the survival respiration of zebra mussels. U.S. Pat. No. 3,676,983 discloses an apparatus including a vacuum chamber and an agitator for removing gases from a liquid. U.S. Pat. No. 4,316,725 discloses several methods, including the use of a vacuum, to remove dissolved oxygen from water. U.S. Pat. No. 3,251,357 discloses injecting combustion/stack gases into water for treating the water to inhibit the growth of, e.g., micro-organisms.

The main object of the present invention is to provide a method and an apparatus which solve the above indicated problems, i.e. the unwanted spreading of biological material by ships' ballast water.

The basic concept of the present invention is to establish a condition of gas super-saturation in said water. We will later in this specification document that gas supersaturation of sufficient level is lethal to various and quite diverse systematic groups of organisms, and it is anticipated that such a condition effectively will kill a substantially population of the organisms present in said water.

The method and apparatus of the present invention can be used separately or in combination with other treatments regimes such as heat treatment, treatment with chemicals and so forth.

In addition to the above indicated publications for the treatment of ballast water systems, several publications describes methods for the destruction of biological material, and particularly micro-organisms.

DE 422074 describes a process for the inhibition of corrosive activity of sulphur bacteria by providing an aerobic environment.

DE 2733000 describes a process for the disintegration of micro-organisms wherein an aqueous suspension is supplied with a compressed gas. The suspension is guided through a disintegration means by which the rapid drop in pressure destroys the cell structure. WO 98/46723 describes a method for disrupting micro-organisms which produce gaseous metabolic products, and U.S. Pat. No. 5,816,181 describes a treatment system for ballast water wherein the water is heated to a temperature sufficient to kill the micro-organisms.

The concept of super-saturation of a water system with a gas is based on the findings that a super-saturated condition is harmful to most aquatic organisms.

An essential feature of the method and apparatus of the present invention is thus to establish a level of gas super-saturation in said water system sufficient to kill the unwanted organisms.

More specifically, the present invention relates to how the introduction of surplus gas into a water system at pressure higher than 1 atm., establishing a sufficient super-saturated level for a sufficient period of time to kill nearly all of the unwanted organisms in said water.

The amount of gas that can be dissolved into water, the saturation concentration, is linearly proportional to the partial pressure of the gas in the air, as described by Henry's law.

A super-saturated condition is in the present application defined as a concentration of dissolved gas above the equilibrium concentration of gas at 1 atm. pressure. Such a system is thermodynamically not at equilibrium, and the concentration of gas over time will change due to the flux over the gas-water interface(s).

Such mass transfer are predominantly due to three factors; 1) the level of turbulent mixing, 2) the amount of surface area available for gas transfer, and 3) the residence time of gas bubbles in said water.

Thus, preferred embodiments of the present invention relates to systems, such as a ships water ballast tanks, constructed to decrease the rate of mass transfer, i.e. to maintain the super-saturated condition as long as possible. Such tanks may for instance have a small air-water interface.

When fish are exposed to gas supersaturated water they may experience gas bubble disease. Gas bubble disease is potentially fatal and commonly recognised by the appearance of bubbles or blisters under the skin. The Environmental Protection Agency (EPO) has recognised this threat to fish and has set water quality standards for dissolved gas levels at 110% of saturation. Gas super-saturation will also be detrimental and finally mortal to other organisms, such as the molluscs *Mya arenaria* at 114% saturation (Bisker, R. et. al., The effect of various levels of air-supersaturated seawater on Mercenaria mercenaria (Linne), Mulinia lateralis (Say), and Mya arenaria Linne, with reference to gas-bubble disease, Journal of Shellfish Research, vol 5, no 2, pp 97–102, 1985. ), and *Argopecten irridans concentricus* at 116% (Bisker, R. et. al., The effect of air-supersaturated sea-water on Argopecten irradians (Lamarck) and Crassostrea virginica (Gmelin) with reference to gas bubble trauma, Journal of Shellfish Research, vol 7, no 1, p150, 1988), subadults of the saltwater tilapia *Oreochromis spilurus at* 111.2 to 113.4%, (Saeed, MO., et. al., Gas bubble disease in farmed fish in Saudi Arabia, Veterinary Record, vol 140, no 26, pp 682–684, 1997), larvae of the white sturgeon *Acipenser transmontanus* at 131% (Counihan T.D. et al., The effects of dissolved gas supersaturation on white sturgeon larvae, Transactions of the American Fisheries Society, vol. 127, no. 2, pp. 316–322, 1998) and adult bullfrog *Rana catesbeiana* at 132.9% (Colt J. et. al., Gas bubble trauma in the bullfrog Rana catesbeiana., Journal of the World Aquaculture Society, vol. 18, no. 4, pp 229–236, 1987).

Thus, an embodiment of the present invention relates to a method for treating water systems wherein a pressurised gas is introduced into the water, establishing a dissolved gas level of more than 120%, more preferable 140%, and most preferable over 160%, i.e. levels of super-saturation which will cause mortality to the organisms in said water.

The principle of the invention has been described in relation to the treatment of ballast water. However, the growth of various organisms is also a problem in other water systems.

Cooling water systems are liable to colonisation by aquatic organisms (bio-fouling). It is important to take action to prevent mussels, oysters, barnacles and other "pests" such as slim forming bacteria becoming established, since bio-fouling can cause serious problems. If fouling goes unchecked, cooling water flows can be reduced to an inadequate level, undue load placed on circulation pumps or condensers, and heat exchangers blocked by shells. Fouling leads ultimately to production losses, equipment damage and high maintenance costs. Bio-fouling has normally been controlled by adding chlorine, in the form of sodium hypochlorite, or by a temporary heating of the cooling water.

The majority of the fouling problems in cooling waters are caused by three species of mussels, the marine mussel *Mytilus edulis*, the brackish water mussel *Mytilopsis leucophaeata* and the fresh water mussel *Dreissena polymorpha*.

It is anticipated that the present invention will also be effective in the treatment of cooling waters in e.g. power generation, and also other water industrial and municipal usage of water.

It is preferred that the method of the present invention is practised using the invention in all its many embodiments as described above. In addition to the novel features and advantages mentioned above, other objects and advantages of the present invention will be readily apparent from the following description of the drawings and preferred embodiments.

Example 1

Figure 1:
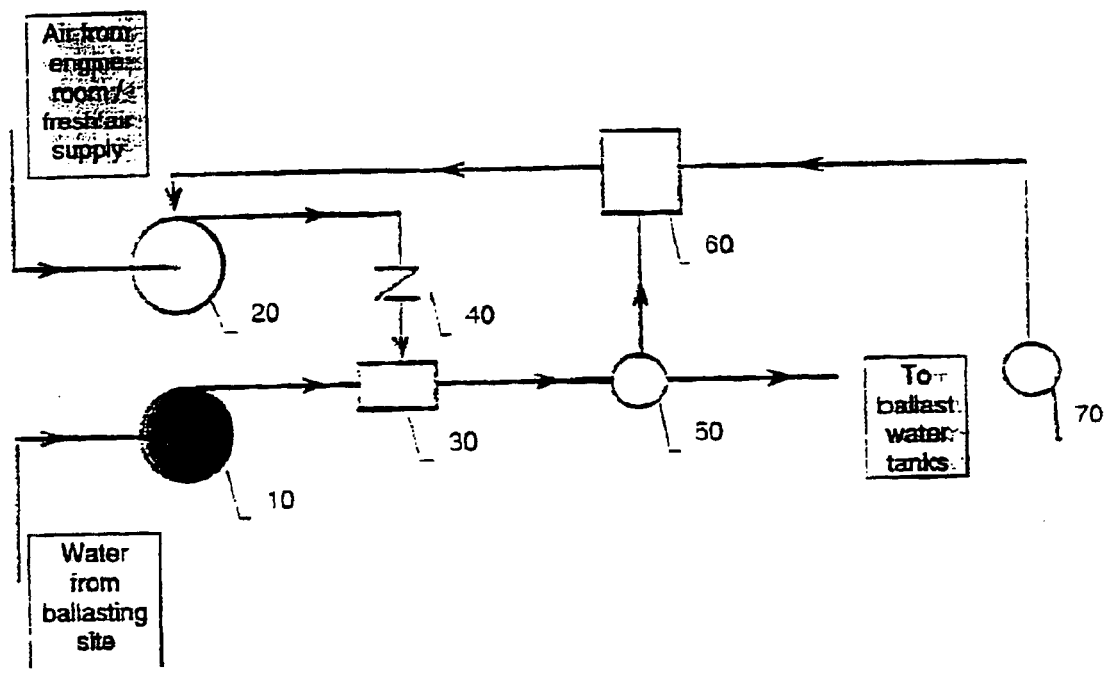
FIG. 1 shows an apparatus for the treatment of ballast water.

Measuring the effect of gas super-saturation.

The main biocidal effects of the treatment is believed to be the biological effects of an imposed gas super-saturation in water and subsequent release of said super-saturation. The release of the supersaturation will be the passive movement back to saturation equilibrium, governed by the atmospheric pressure, temperature, surface area and turbulence of the water mass, e.g. from sloshing in upper part of tank.

The water to be treated is transported through a pump creating a pressure higher than ambient at surface waters. At the pressurised side of the pump, a gas compressor delivers compressed gas, optionally through a diffusor, into the water stream.

The gas diffusor will ensure three important functions:
1) Producing a large surface area facilitating a rapid mass transport of gas into the water, thus reducing the contact time needed for establishing super-saturation.
2) Creating numerous small gas bubbles facilitating the flotation of various shell-bearing organisms where bubbles can be entrapped in the shells.
3) Creating a large hydrophilic/hydrophobic surface area where hydrophobic bacteria are transported to, and enriched in the surface layers where they can enhance the degradation of floateted organisms.

Various gases can be utilised for this purpose, but as air is both ubiquitous and for free, air would be the natural choice for most applications. For special applications, other gases such as nitrogen might be used.

A MosselMonitor® has been developed by KEMA, and this enables us to accurately record the mussels' valve activity. By attaching sensors to the mussels, we can keep a record of what the mussels behaviour are underwater. This model system will be used to determine the effect of various levels of super-saturation on the zebra mussel *Dreissena polymorpha*.

Another relevant test model would be various life stages of the brine shrimp *Artemia sp.*

The concentration of dissolved gas were measured using a total dissolved gas meter, e.g. Comon sensing TBOC-L meter.

Example 2

The effect of air supersaturation on naupilus larvae of *Artemia sp.*

Materials and methods.

*Artemia naupleii* cysts were hatched and enriched with 0.2 gram DC DHA Selco enrichment pr liter of culture (Both cysts and enrichment: INVE Aquaculture, Hogveld 91 Denermunde, Belgium) the day following hatching. The culture was grown in seawater at 34.7 ppt, at 26° C. in 250 l tanks. The naupleii were harvested, concentrated and stored in a 70 l tank with aeration and oxygenation at a density of 1100 *naupleii* pr ml. Temperature in the storage tank was 140° C. Two ml of *Artemia naupleii* (i.e. approximately 2200) was collected from the storage tank and distributed in each of two tanks of stainless steel filled with 22 liter of seawater (34.7 ppt). The tanks have a total volume of 26 liter and temperature throughout the experiment was kept at 12.5+0.50° C. One unit was subjected to gas super-saturation and one unit served as control.

The experimental unit were supplied with a tube delivering pressurized air (Fini type Big pioneer 255, Zola Predosa Bo, Italy) through a ceramic diffusor (Birger Christensen P.O. box 13, N-1309 Rud, Norway), a pressure gauge and an outlet with a valve. The control unit were supplied with an air supply and an outlet.

When the *naupleii* were distributed, the units were closed, and compressed air at 3 bar was delivered to the diffusor. As the pressure built in the unit, the outlet valve was regulated to give a pressure of 1 atm above ambient. The outlet gas was led through a tube into a beaker of water aiding inspection of flow, as well as facilitating the measurements of airflow through the system. In the control unit, the pressure was kept at ambient, and air was supplied at the same flow as in the experimental unit.

The *naupleii* were kept in the units for 18 h, and when the experiment was terminated, the outlet valve was adjusted to release the pressure to give ambient pressure after one hour.

The gas super-saturation was measured by a Weiss saturometer (Eco Enterprises, Seattle WN, U.S.A) before sampling commenced.

For each hour following the pressure release, 11 batches of water from the units were collected trough a sieve (80μm mesh size) in triplicate, and the number of *Artemia naupleii* was observed in a binocular microscope. *Naupleii* unable to move, or in obvious degradation were scored as dead as opposed to moving individuals. Results are given in Table 1.

Results:

Nitrogen supersaturation was calculated to 119% after adjustment for Bunsen coefficient temperature, salinity and oxygen saturation.

Number of *naupleii* recovered from the tanks in the 6 hours following the release of the pressure. An * denoted a complete sampling of the remaining 6 liter seawater.

TABLE 1

Number of *naupleii* recovered from the tanks in the 6 hours following the release of the pressure. An * denotes a complete sampling of the remaining 6 liter seawater.

| Control tank (n at t = 0:2171) | | | Super-saturation tank (n at t = 0:2149) | | |
|---|---|---|---|---|---|
| Alive | Dead | Total | Alive | Dead | Total |
| 115 | 15 | 130 | 90 | 19 | 109 |
| 171 | 10 | 181 | 73 | 22 | 95 |
| 120 | 3 | 123 | 70 | 10 | 80 |
| 90 | 4 | 94 | 30 | 4 | 34 |
| 204 | 15 | 229 | 107 | 18 | 125 |
| 409* | 57* | 466* | 303* | 86* | 389* |
| Σ 1109 | 104 | 1223 | 673 | 159 | 832 |

The number of *naupleii* recovered in the control unit was 1109 after the experiment, which represents 56.3% of the initial number of *naupleii* added. In the supersaturation unit, the number of *naupleii* recovered was 832, which represents 38.7% of the initially added *naupleii* (Table 1).

The number of *naupleii* recovered alive in the two units were 1109 from the control unit and 673 in the supersaturation unit, which corresponds to 51.1 and 31.3% on initial numbers, respectively.

While the initial numbers of *naupleii* was slightly different in the two units, it should be possible to test a null hypothesis of no difference between the treatments.

The difference of the supersaturated unit is significantly different from the control unit at the p=0.001 level according to the Chi squared test.

We thus conclude that the exposure of air super-saturation of up to 119% for 20 hours increases the mortality of *Artemia naupleii* significantly (p=0.001 Chi squared).

Example 3

Apparatus for ballast water treatment

FIG. 1 shows a schematic set-up of a treatment system for ballast water. The embodiment shown in FIG. 1 is added to existing ballast water systems on the ship. Ballast water is taken from outside the ship and is pumped through the ships' own ballast pump 10. An air compressor 20 delivers compresses air through a diffusor 30 into the ballast water stream at the pressurised side of the ballast water pump. A backflushing valve prevents pressurised water from entering the air compressor 20. En route to the ballast tanks, a meter for super-saturation 50 reports to a controller/logging PLS, which controls the air compressor 20. Optionally, a super-saturation meter 70 in the ballast tanks may report to the PLS. The proposed treatment system can easily be installed in existing ships (retrofitted).

Figure 2:
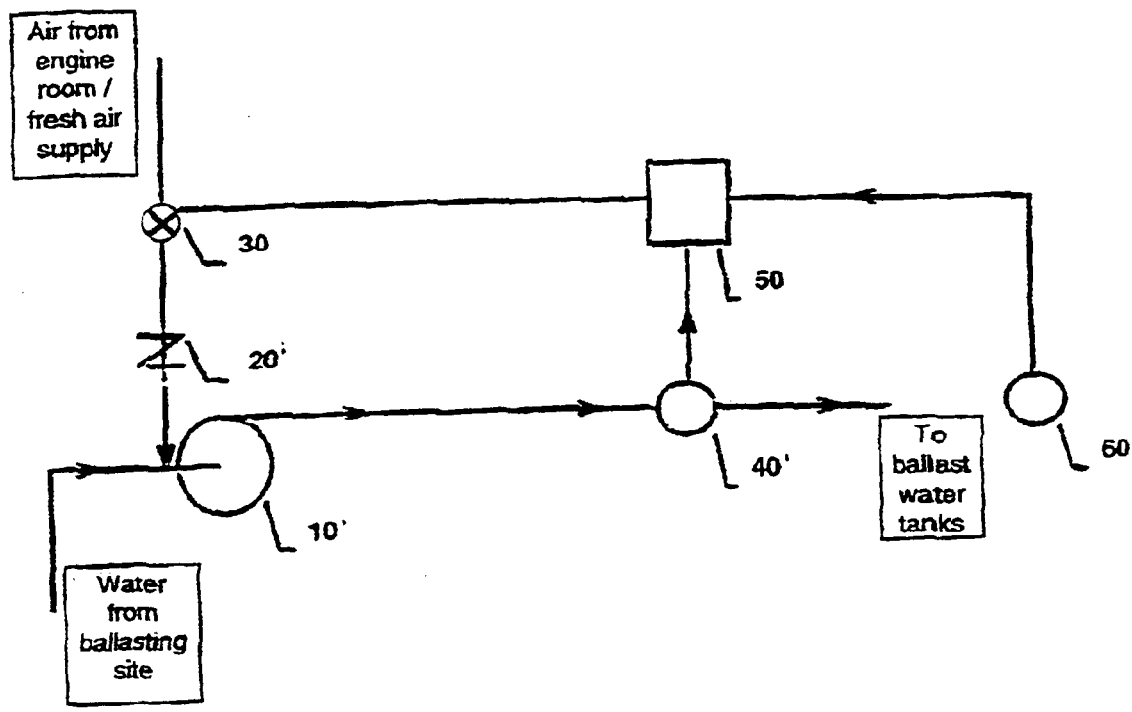
FIG. 2 shows an alternative embodiment of an apparatus for the treatment of ballast water.

Alternatively, as shown in FIG. 2, if the pump excerts sufficient suction before the centrifugal head, air can be let into the water flow by this suction alone, through an air inlet from above the water surface.

This system can also easily be added to the existing ballast water system of the ship. Ballast water is pumped through the ship's own ballast pump 10'. Air is supplied either through a pipe entering from over sea surface level, or from the machine room. Preferably, the air is entered at the suction side of the pump. A backflush valve 20' prevents the overflow of water into the machine room or piping if higher pressure than ambient air pressure should occur in the water flow. En route to the ballast pump, a meter 40' for super saturation reports to a controller/loging PLS 50', controlling an air regulating valve 30'. optionally, supersaturation meters 60' in the ballast tanks may report to the PLS.

Example 4
Ballast tank

Figure 3:
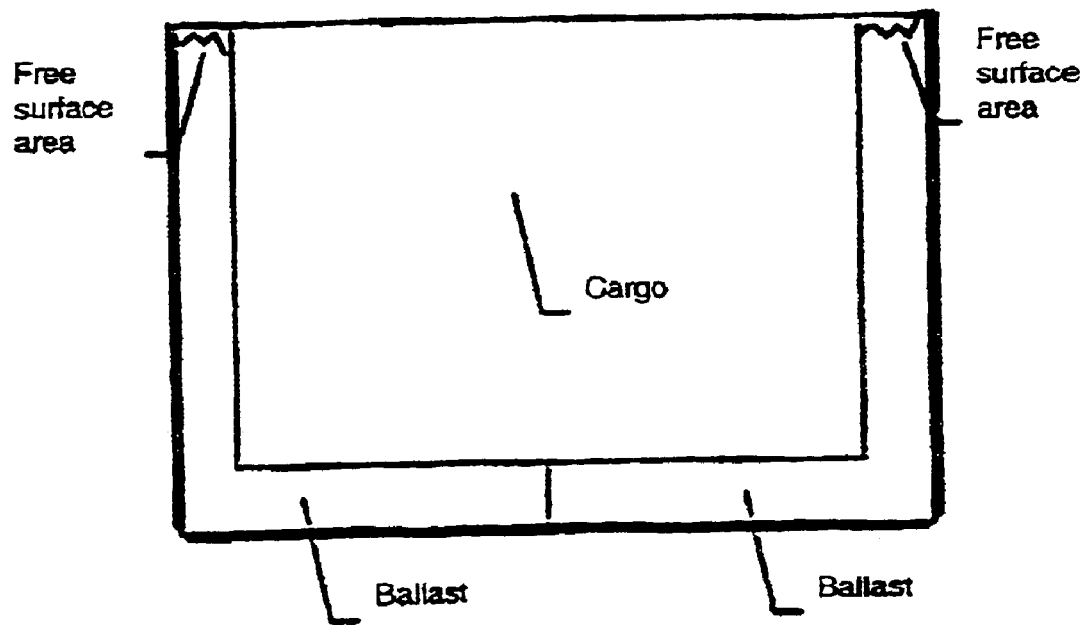
FIG. 3 shows in a cross section a ballast tank.

FIG. 3 shows a cross section of a modern tank vessel. Supporting structural components are omitted for the sake of clarity. The surface area are relatively small compared to the volume of the ballast water, thus ensuring a slow exchange of gas over the air/water surface.

Example 5
Treatment system for cooling water systems

Figure 4:
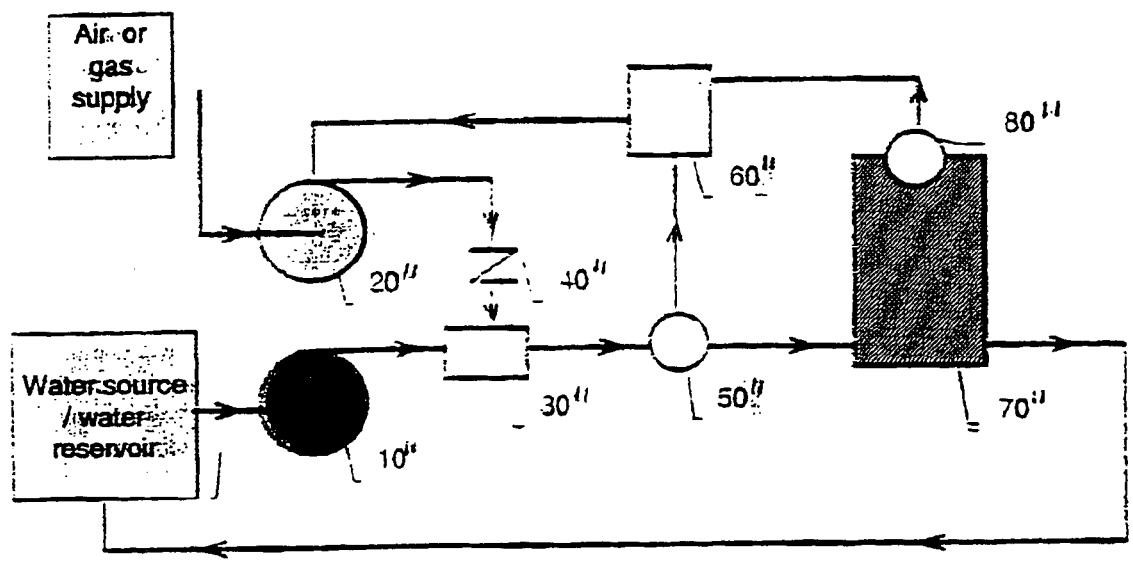
FIG. 4 shows an apparatus for the treatment of industrial water, such as cooling water.

FIG. 4 shows a treatment apparatus for industrial water usage, e.g. cooling water. The system can use a dedicated pump 10", or be fitted into the existing water pump. An air compressor 20" delivers compressed air through a diffusor 30" into the water stream at the pressurised side of the water pump. A back-flushing valve 40' prevents pressurised water from entering the air compressor. En route to the industrial application 70", a meter for super-saturation 50" reports to a controller/logging PLS 60", controlling the air compressor. A super-saturation meter 80" in the industrial application 70" may report to the PLS. The water may be recycled back to the reservoir.

What is claimed is:

1. A process to kill organisms in a water system, said process comprising the step of introducing a gas into the water system in an amount sufficient to establish a super-saturated condition sufficient to kill aquatic organisms in the water system, wherein the amount of gas is at a level of more than 120%, relative to the saturation level for said gas at 1 atm pressure.

2. A process as set forth in claim 1 where said gas is a pressurized gas.

3. A process as set forth in claim 1 where said gas is introduced into said water system under suction.

4. A process as set forth in claim 1 where said water system includes a ballast tank of a ship.

5. A process as set forth in claim 1 characterized in that the amount of gas is at a level of more than 140%, relative to the saturation level for said gas at 1 atm pressure.

6. A process as set forth in claim 1 characterized in that the amount of gas is at a level of more than 160%, relative to the saturation level for said gas at 1 atm pressure.

7. A process as set forth in claim 1 characterized in that the gas supersaturated condition in said water system is maintained for more than 1 hour.

8. A process as set forth in claim 1 characterized in that the gas supersaturated condition in said water system is maintained for more than 12 hour.

9. A process as set forth in claim 1 characterized in that said gas is air.

10. A process as set forth in claim 1 characterized in that said water system is one of a cooling water system, a water supply for industrial processing and a canal or river system through which the spread of unwanted organism should be prevented.

11. A process to kill organisms in a water system, said process comprising the step of introducing nitrogen gas into the water system in an amount sufficient to kill aquatic organisms in the water system. nitrogen gas into the water system in an amount sufficient to establish a supersaturated condition sufficient to kill aquatic organisms in the water system.

12. A process as set forth in claim 11 where said nitrogen gas is a pressurized gas.

13. A process as set forth in claim 11 where said nitrogen gas is introduced into said water system under suction.

14. A process as set forth in claim 11 where said water system includes a ballast tank of a ship.

15. A process as set forth in claim 11 characterized in that the amount of gas is at a level of more than 120%, relative to the saturation level for said gas at 1 atm pressure.

16. A process as set forth in claim 11 characterized in that the amount of gas is at a level of more than 140%, relative to the saturation level for said gas at 1 atm pressure.

17. A process as set forth in claim 11 characterized in that the amount of gas is at a level of more than 160%, relative to the saturation level for said gas at 1 atm pressure.

18. A process as set forth in claim 11 characterized in that the gas supersaturated condition in said water system is maintained for more than 1 hour.

19. A process set forth in claim 11 characterized in that the gas supersaturated condition in said system is maintained for more than 12 hour.

20. An apparatus for the treatment of a body of water to kill organisms therein comprising a gas delivery means for delivering gas into the body of water in an amount sufficient to establish a supersaturated condition in said body of water;

a measuring means for measuring the level of supersaturation in said body of water; and a controller for receiving a signal from said measuring means indicative of the measured level of supersaturation in said body of water, said controller being in communication with said gas delivery means to control the delivery of gas into said body of water in dependence on said signal.

21. An apparatus as set forth in claim 20 wherein said gas delivery means is a compressor.

22. An apparatus as set forth in claim 21 further comprising a diffuser downstream of said compressor relative to the flow of gas.

* * * * *

UNITED STATES PATENT AND TRADEMARK OFFICE
CERTIFICATE OF CORRECTION

PATENT NO. : 6,921,488 B1
APPLICATION NO. : 10/130209
DATED : July 26, 2005
INVENTOR(S) : Anders Jelmert It is certified that error appears in the above-identified patent and that said Letters Patent is hereby corrected as shown below:

Claim 8, line 48 "hour" should be -- hours --
Claim 11, lines 5-7, delete "nitrogen gas into the water system in an amount sufficient to kill aquatic organisms in the water system."
Claim 19, line 31 "hour" should be -- hours --

Signed and Sealed this

Thirteenth Day of May, 2008

JON W. DUDAS
*Director of the United States Patent and Trademark Office*

UNITED STATES PATENT AND TRADEMARK OFFICE
CERTIFICATE OF CORRECTION

PATENT NO. : 6,921,488 B1
APPLICATION NO. : 10/130209
DATED : July 26, 2005
INVENTOR(S) : Anders Jelmert Page 1 of 1

It is certified that error appears in the above-identified patent and that said Letters Patent is hereby corrected as shown below:

Column 7, Claim 8, line 48 "hour" should be -- hours --
Column 8, Claim 11, lines 5-7, delete "nitrogen gas into the water system in an amount sufficient to kill aquatic organisms in the water system."
Column 8, Claim 19, line 31 "hour" should be -- hours --

This certificate supersedes the Certificate of Correction issued May 13, 2008.

Signed and Sealed this

Third Day of June, 2008

JON W. DUDAS
*Director of the United States Patent and Trademark Office*